United States Patent Office 3,221,063
Patented Nov. 30, 1965

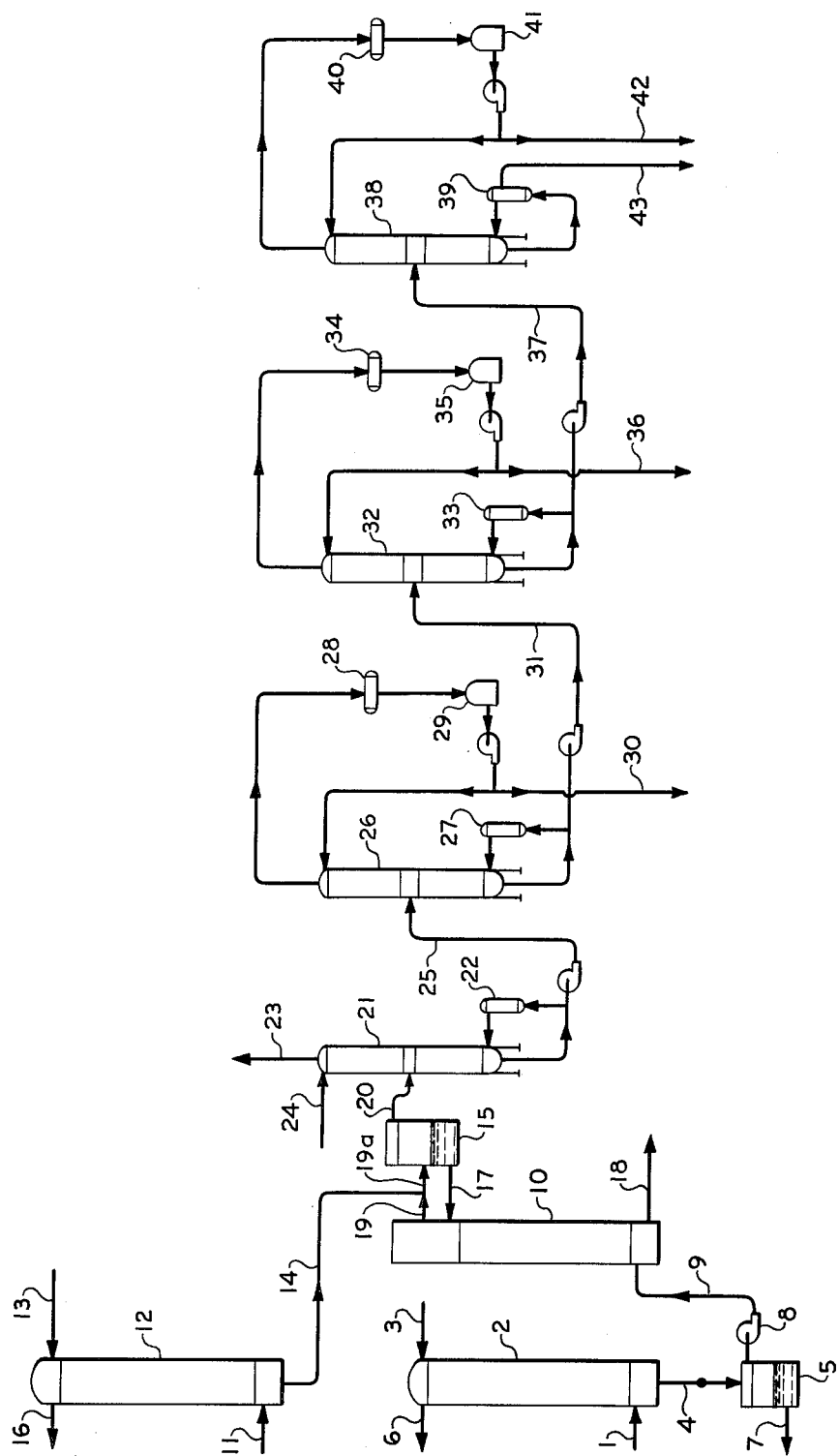

3,221,063
DISTILLATION IN RASCHIG-PHENOL PROCESS
Walter H. Prahl, Buffalo, Jay P. Eggert, Snyder, Buffalo, Sol J. Lederman, Kenmore, and Eric H. Scremin, Niagara Falls, N.Y., assignors to Hooker Chemical Corporation, Niagara Falls, N.Y., a corporation of New York
Filed Aug. 25, 1961, Ser. No. 133,924
8 Claims. (Cl. 260—629)

This invention refers to the production of phenol by the combination of the oxychlorination of benzene and the hydrolysis of monochlorobenzene, and more particularly to an integrated distillation method in the so-called Raschig phenol process.

The Raschig-phenol process is a combination of two partial processes or stages. In the first stage benzene is converted by means of hydrochloric acid and an oxygen-containing gas over a catalyst into monochlorobenzene according to the equation:

$$C_6H_6 + HCl + \tfrac{1}{2}O_2 \rightarrow C_6H_5Cl + H_2O$$

In the second stage the monochlorobenzene is then hydrolyzed over a hydrolysis catalyst to phenol and hydrogen chloride according to the equation:

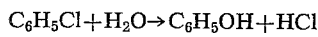

$$C_6H_5Cl + H_2O \rightarrow C_6H_5OH + HCl$$

The hydrogen chloride is returned to the first stage for reuse.

The overall theoretical equation for the Raschig-phenol process is as follows:

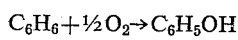

$$C_6H_6 + \tfrac{1}{2}O_2 \rightarrow C_6H_5OH$$

In the first stage, the chlorination reaction produces, in addition to monochlorobenzene, certain by-products, including dichlorobenzenes, trichlorobenzenes, tetrachlorobenzenes, pentachlorobenzene, hexachlorobenzene, and other products formed by the interaction of benzene, hydrochloric acid, and the oxygen-containing gas.

In the second stage the hydrolysis reaction produces, in addition to the main products of phenol and hydrogen chloride, lesser amounts of benzene, chlorophenols, and high boiling tarry by-products.

As described in U.S. Patent 2,035,917, and as carried out in practice, the two partial processes are combined in three respects: One is that the hydrochloric acid generated in the second stage is recycled into the first stage to be used in the chlorination. The second is that the flue gas, used in heating the chlorobenzene-water mixture going to the hydrolysis catalyst and having thus been lowered in temperature, is used in heating the benzene vapors going into the chlorination stage. And the third is that the benzene to be chlorinated in the chlorination stage is first used for the extraction of phenol from the reaction products of the hydrolysis stage. Outside of these three features, the two partial processes, the combination of which represents the Raschig-phenol process, have been carried out as individual processes.

The reason for carrying out the purification of the chlorination products separately from the purification of the hydrolysis products is that the products of each stage can be separated from each other by simple fractional distillation. The distillation train for the chlorination products of the first stage separates them by simple fractional distillation into benzene, monochlorobenzene and a higher boiling residue containing higher chlorinated benzenes from di- to hexachlorobenzene. And the distillation train for the hydrolysis reaction products of the second stage separates them by simple fractional distillation into monochlorobenzene, phenol and a residue containing high boiling pitch-like by-products. In each of these separate systems no azeotropes are formed, thus permitting separation by simple fractional distillation.

This method, however, has been found to have several practical disadvantages. It requires that the separation be carried out to a very high degree of purity. For instance, traces of dichlorobenzene, left in the monochlorobenzene going from the chlorination to the hydrolysis step contaminate the phenol product with organic chlorine compounds, because part of the dichlorobenzene would pass together with the monochlorobenzene through the catalyst unchanged and form an azeotrope with phenol, which cannot be separated from it by simple fractional distillation and part of the dichlorobenzene would partially hydrolyze to chlorophenols, which have a boiling point close to that of phenol, and thereby form a mixture which from a practical standpoint is not separable by simple distillation. The same reasoning applies to other chlorine-containing substances in the processs.

Another disadvantage is that the investment and operation costs are high because two similar but separate distillation trains are used.

The products coming from the chlorination and the hydrolysis stages contain among other substances, in the order of their boiling points: benzene (80.1 degrees centigrade), monochlorobenzene (131.7 degrees centigrade), meta- (173.1 degrees centigrade), and para- (174.2 degrees centigrade) dichlorobenzene, ortho-chlorophenol (174.9 degrees centigrade), ortho-dichlorobenzene (180.5 degrees centigrade), phenol (181.7 degrees centigrade), 1,3,5-trichlorobenzene (208.5 degrees centigrade), 1,2,4-trichlorobenzene (213.5 degrees centigrade), parachlorophenol (217 degrees centigrade), 1,2,3-trichlorobenzene (219 degrees centigrade), the tetrachlorobenzenes (246 to 254 degrees centigrade), penta- (277 degrees centigrade), and hexachlorobenzene (326 degrees centigrade), together with numerous unidentified products of the chlorination, as well as the hydrolysis reaction.

Therefore, it is an object of the present invention to simplify the recovery and purification of the end products of the two stages of the Raschig-phenol process.

Another object is to reduce the number of columns and auxiilary equipment used in isolating the products.

Still another object is to afford a more economical process for producing phenol by means of the Raschig process.

A further object is to effect a closer separation of the products of the Raschig process.

Other objects of this invention will become apparent in the course of this description.

These objects are achieved according to the present invention by the method which comprises: (1) condensing the chlorination reaction product to form liquid chlorination product, (2) condensing the hydrolysis reaction product to form liquid hydrolysis product, (3) mixing the said liquid hydrolysis product with the said liquid chlorination product, to form a two-phase mixed product, (4) separating the organic-phase from the aqueous-phase of said two-phase mixed product, to form an organic mixed product and (5) passing the said organic mixed product through a distillation train in which it is separated into a fraction consisting essentially of benzene, a fraction consisting essentially of monochlorobenzene, a fraction of an azeotrope-type mixture comprising phenol, the lower polychlorobenzenes and chlorophenol, and a fraction consisting essentially of phenol. In this manner the number of distillation columns, evaporators, condensers, etc. are materially reduced and the operation is greatly simplified.

Our invention is based on a combination of unexpected discoveries, the main ones of which are as follows:

The first discovery was that chlorinated benzenes with two or three chlorine atoms form low-boiling azetropes with phenol, and that the components of these azeotropes can be separated from each other by means of azeotropic distillation with water.

The second discovery was that chlorinated benzenes having four or more chlorine atoms boil above phenol with no azeotropes formed, and can be separated from phenol by means of simple fractional distillation.

A third discovery was that disclosed in copending application S.N. 133,802, filed on even date herewith, that the di- and trichlorobenzenes from the chlorination stage and chlorophenol from the hydrolysis stage, when passed through the hydrolysis stage with monochlorobenzene, will convert to phenol rather than their expected hydrolysis products.

Therefore as a result of these and other important discoveries the previous investment and operating costs of separating and purifying the monochlorobenzene before using it as feed to the hydrolysis stage in one distillation train and separating and purifying the phenol in a second train can now be eliminated by combining the organic products of both stages and recovering the components therefrom in a single azeotropic distillation train.

As used in the description, "azeotrope-type mixture" is intended to denote mixtures of chlorinated benzenes with phenol which boil below the boiling point of phenol under the same pressure. It does not refer to the quantitative composition of such mixtures. Particularly it does not necessarily denote the accurate composition of such mixtures having the minimum azeotropic boiling point.

The gaseous reaction products of each stage can be condensed in any number of ways known in the art. We prefer to condense the chlorination reaction product by introducing it near the bottom of a chlorination-product distillation and condensation zone into the top of which is being fed water and benzene. And we prefer to condense the hydrolysis reaction product by introducing it near the bottom of a hydrolysis-product distillation and condensation zone into the top of which is being fed water and monochlorobenzene.

The resultant hydrolysis reaction liquid product has two phases. Since both of them contain phenol, both phases are preferably used in the mixing step.

The resultant chlorination reaction liquid product also has two phases and we prefer to first separate the water-phase from the organic-phase and use only the organic phase, preferably after using it for the extraction of the phenol from the aqueous phase of the mixed product, to mix the hydrolysis stage condensation product. The water phase may be used elsewhere in the process, such as with monochlorobenzene to condense the hydrolysis reaction product.

The mixing of the liquid products of the two reaction stages according to this invention to form the organic mixed product, can be carried out by several methods, in any sequence, and partially or totally. Our preferred method is to use the condensed organic products of the chlorination stage for the purpose of extracting the phenol dissolved in the acid of the aqueous-phase produced in the hydrolysis stage, and effecting the mixing operation. For example, the organic-phase separated from the liquid chlorination product can be introduced near the bottom of a liquid-liquid extraction zone into which has been introduced near the top the phenol-containing aqueous-phase separated from the resultant mixed materials, withdrawing a phenol-enriched organic phase from the top of said liquid-liquid extraction zone and co-mingling it with the liquid hydrolysis product. This in turn is separated into an upper organic-phase of mixed organic product to be distilled and the lower phenol-containing aqueous phase to be extracted. Another method would be to extract the phenol from the aqueous-phase of the hydrolysis product with the organic-phase of the chlorination product, and then co-mingle the resultant phenol-containing organic chlorination product with the organic-phase of the hydrolysis product to form a two-phase mixed product, which in turn is separated into the organic mixed product to be distilled.

Of the fractions separated in the distillation train, the benzene, and monochlorobenzene can be used directly in the process. The third named fraction, comprising some phenol, the lower polychlorobenzenes, chlorophenol and products of similar properties, can be recycled for conversion to phenol, according to the above-mentioned copending application, or it can be separated either by azeotropic distillation with water, or by some other means.

The separation of the organic mixed product by means of fractional distillation can be carried out by batch or by continuous operations, and in several different sequences. Our preferred method is a train of four columns, operated continuously, through which the mixture passes in series. The top product of the first column is benzene in vapor form, which can be returned to the first stage to be used in the vapor phase chlorination. From the bottoms products of the first column the second column separates at the top monochlorobenzene in vapor form which can be used in the second stage. The bottoms product of the second column is passed on to the third column where an azeotrope-type mixture of di- and trichlorobenzenes with phenol as well as chlorophenol is driven over the top. The phenol-rich bottoms product of the third column is separated in the fourth column into substantially pure phenol, at the top, and a mixture containing higher boiling substances, such as the tetra-, penta-, and hexachlorobenzene, parachlorophenol, and numerous other residue materials found in the reaction, is removed from the bottom. Other distillation sequences may also be used to obtain these fractions, however, and we do not wish to be limited hereto.

In carrying out the step of removing the fraction containing the azeotropes of phenol with the di- and trichlorobenzenes, it was found that the polychlorobenzene content of the distillate increases with decreasing pressure. We therefore prefer to carry out this step of the distillation under vacuum.

Various modifications to the above general description of our invention can be made and we do not wish to be limited to same except as defined in the appended claims.

Referring to the figure, the reacted product mixture of the chlorination stage comprising monochlorobenzene, higher chlorobenzenes, unreacted benzene, steam and hydrogen chloride enters in vapor form through duct 1 a distillation and condensation column 2, where, by means of liquid benzene, and water fed into the column 2 through pipe line 3, the chlorinated benzene and hydrochloric acid, together with unreacted benzene, are scrubbed or condensed out as a two-phase liquid chlorination product, leaving the column through pipe 4 into a gravity separator 5. The vaporous water, benzene, and inert compounds go through duct 6 to further processing. In gravity separator 5 the condensation product is separated into a lower layer of aqueous-phase material which is returned through pipe 7 into the process, and into an upper layer of organic-phase liquid chlorination product comprising benzene and monochlorobenzene along with other products of the chlorination reaction. This organic-phase of the chlorination product is then passed through pump 8 and line 9 into the bottom of a liquid-liquid extraction column 10.

The reacted product of the hydrolysis stage, comprising phenol, steam, hydrogen chloride and unconverted monochlorobenzene enter in vapor form through duct 11, a distillation and condensation column 12, where, by means of monochlorobenzene and water entering column 12 near the top through line 13, the liquid hydrolysis product comprising phenol and hydrochloric acid is scrubbed or condensed out and leaves column 12 through line 14. Unreacted monochlorobenzene and water leave column 12 in vapor form through duct 16 and are returned to the process.

In the figure the liquid hydrolysis product, withdrawn from column 12 through line 14, is then co-mingled, merged, joined or mixed with the phenol-containing organic-phase of the liquid chlorination product at the top of the liquid-liquid extraction column 10 by injecting it directly into the phenol-enriched organic material emerging from the top of column 10 through line 19. The resultant two-phase mixed product stream is then passed through line 19a into gravity separator 15, and separated into a lower phenol-containing mixed product aqueous-phase and an upper organic mixed product. The aqueous-phase comprising phenol dissolved in about fifteen to about twenty percent hydrochloric acid, is withdrawn through line 17 and passed into the top portion of the liquid-liquid extraction column 10 where its phenol content is extracted as the aqueous-phase passes down through the column in counter-current flow to the upward rising organic-phase benzene-monochlorobenzene material entering the bottom portion of column 10 through line 9. The extracted aqueous phase leaves column 10 through line 18 for re-use in the chlorination stage of the process. Although this is our preferred method of mixing the liquid hydrolysis product with the liquid chlorination product, we do not wish to be limited hereto, since the two products can be mixed in a number of ways to obtain the desired organic mixed product to be passed through the subsequent single distillation train.

The organic layer leaving the top of the gravity separator 15 through line 20 comprises all the constituents enumerated just before the objects herein, as well as some water and hydrogen chloride. The ratio of phenol to the dichlorobenzenes in this organic mixed product must be at least equal to that prevailing in the mixture of phenol and dichlorobenzene having a minimum boiling point in order to have a phenol-rich bottoms product in the azeotropic distillation train of this invention. In the normal operation of the process, the phenol content of this organic mixed product is many times higher than this limiting value.

The hydrogen chloride content of this organic mixed product depends on the solubility of hydrogen chloride in the material under the conditions prevailing in separator 15. Although its quantity compared to that of the other constituents is very small, it is ordinarily necessary to remove it in order to prevent corrosion in the distillation train. Removal of this hydrogen chloride can be affected, for instance, by neutralization with sodium hydroxide, sodium carbonate, lime, or other alkaline substances, or by azeotropic distillation in a column protected from corrosion by HCl, or by any of the other means known to the art.

The organic mixed product constitutes the starting mixture of the liquid products of the two stages to be distilled in accordance with the teaching of our invention. This starting mixture in line 20 passes into fractionation column 21, equipped with reboiler 22, in which a product consisting essentially of benzene is driven off, exiting from column 21 in vapor form through duct 23 for re-use in the process, while the higher boiling substances are kept back by a reflux of liquid benzene entering through line 24.

The column 21 bottoms, substantially free of benzene, enter through line 25 the next distilling column 26, equipped with reboiler 27, condenser 28 and receiver 29. This column drives over substantially all of the monochlorobenzene. This distillate is taken off through line 30 to be used in the process.

The column 26 bottoms, substantially free of monochlorobenzene, passes through line 31 into a third fractionating column 32, equipped with reboiler 33, condenser 34, and receiver 35. This column 32 is preferably adapted to operate under vacuum and drives over substantially all of the dichlorobenzenes and trichlorobenzenes in the form of their azeotropes with phenol and substantially all of the chlorophenol, which is taken off through line 36. This overhead material contains enough phenol to form the azeotrope-type composition with the di- and trichlorobenzene and chlorophenol constituents present. The amount of the phenol relative to the other ingredients in this overhead stream may vary somewhat as the composition and relative proportions of the other named constituents vary. The overheads of column 32, comprising the azeotropic-type mixture, can be returned to the process for re-use in the hydrolysis stage, according to the above-mentioned copending application.

The column 32 bottoms of this distillation comprising phenol and higher boiling substances, passes through line 37, into a fourth distilling column 38, equipped with reboiler 39, condenser 40 and receiver 41. This column drives over substantially pure phenol, which is removed through line 42 for commercial use. The residue from column 38, containing the higher boiling substances, leaves the system through line 43 for disposal.

It is obvious to those of ordinary skill in this art that the purpose of recovering commercial products out of the mixture of the products of the chlorination and hydrolysis reaction of the Raschig phenol process can be achieved by numerous other methods of mixing and/or distilling, without deviating from the spirit of this invention, and we do not wish to be limited hereto except as defined in the appended claims.

We claim:

1. In a continuous process for the production of phenol by the oxychlorination of benzene to form chlorination product comprising monochlorobenzene, dichlorobenzene and benzene in a first stage, and the hydrolysis in a second stage with steam of material comprising monochlorobenzene to form hydrolysis product comprising phenol, monochlorobenzene and HCl, the method of separating and recovering phenol therefrom which comprises (1) mixing hydrolysis product comprising phenol and monochlorobenzene with chlorination product comprising monochlorobenzene, dichlorobenzene and benzene, to form liquid organic mixed product, and (2) passing said liquid organic mixed product through a distillation train in which benzene, monochlorobenzene, an azeotrope-type mixture comprising dichlorobenzene and phenol, and a fraction consisting essentially of phenol, are separated therefrom.

2. The process according to claim 1 wherein the mixing is carried out by the steps comprising: (1) introducing said chlorination product near the bottom of a chlorination product distillation and condensation zone into the top of which are being fed water and benzene, to form at the bottom thereof two-phase liquid chlorination condensation product having an organic-phase and a water-phase, (2) separating the water-phase from the organic-phase of said chlorination condensation product (3) introducing said hydrolysis product near the bottom of a hydrolysis product distillation and condensation zone into the top of which are being fed water and monochlorobenzene, to form at the bottom thereof hydrolysis condensation product, (4) introducing said chlorination condensation product organic-phase near the bottom of a liquid-liquid extraction zone near the top of which is being introduced the phenol-containing aqueous-phase of step 6 to thereby extract the phenol from said aqueous-phase and form phenol-enriched organic chlorination product, (5) withdrawing said phenol-enriched organic chlorination product near the top of said liquid-liquid extraction zone and co-mingling it with said hydrolysis condensation product of step (3), to form a two-phase mixed product having an organic-phase and an aqueous-phase, and (6) separating the organic-phase from the aqueous-phase of said two-phase mixed product, to form the said liquid organic mixed product and a phenol-containing aqueous-phase.

3. The process according to claim 1 wherein the mixing is carried out by the steps comprising: (1) introducing said chlorination product near the bottom of a chlorination product distillation and condensation zone into the top of which are being fed water and benzene, to form at the bottom thereof two-phase liquid chlorination condensation product having an organic-phase and a water-phase, (2) separating the water-phase from the organic-phase of said chlorination condensation product, (3) introducing said hydrolysis product near the bottom of a hydrolysis product distillation and condensation zone into the top of which are being fed water and monochlorobenzene, to form at the bottom thereof two-phase hydrolysis condensation product having an organic-phase and an aqueous-phase both of which contain phenol, (4) extracting the phenol from said aqueoue-phase of the hydrolysis condensation product with said organic-phase of the chlorination condensation product, to form a phenol-enriched organic chlorination product, and (5) mixing the organic-phase of said hydrolysis condensation product with said phenol-enriched organic chlorination product, to form said liquid organic mixed product.

4. In a continuous process for the production of phenol by the oxychlorination of benzene to form chlorination product comprising monochlorobenzene, higher and lower polychlorobenzene and benzene in a first stage, and the hydrolysis in a second stage with steam of material comprising monochlorobenzene to form hydrolysis product comprising phenol, monochlorobenzene, steam and HCl, the method of separating and recovering phenol therefrom which comprises: (1) mixing hydrolysis product comprising phenol and monochlorobenzene with chlorination product comprising monochlorobenzene, lower and higher polychlorobenzene and benzene, to form liquid organic mixed product, (2) passing the said liquid organic mixed product through a distillation train in which benzene, monochlorobenzene, an azeotrope-type mixture comprising lower polychlorobenzene and phenol, and a fraction consisting essentially of phenol, are separated therefrom, and (3) separating the components in the said azeotrope-type mixture from each other by azeotropic distillation with water.

5. In a continuous process for the production of phenol by the oxychlorination of benzene to form chlorination product comprising monochlorobenzene, higher and lower polychlorobenzene and benzene in a first stage, and the hydrolysis in a second stage with steam of material comprising monochlorobenzene to form hydrolysis product comprising phenol, monochlorobenzene, steam and HCl, the method of separating and recovering phenol therefrom which comprises: (1) condensing said chlorination product with water, to form chlorination condensation product comprising monochlorobenzene, higher and lower polychlorobenzene, benzene and water, (2) condensing said hydrolysis product to form hydrolysis condensation product comprising phenol, monochlorobenzene and water, (3) mixing hydrolysis condensation product with chlorination condensation product, to form a two-phase liquid mixed product having an organic-phase and an aqueous-phase, (4) separating the organic-phase from the aqueous-phase of said two-phase liquid mixed product, to form liquid organic mixed product, and (5) passing the said liquid organic mixed product through a distillation train in which benzene, monochlorobenzene, an azeotrope-type mixture comprising lower polychlorobenzene and phenol, and a fraction consisting essentially of phenol, are separated therefrom.

6. In a continuous process for the production of phenol by the oxychlorination of benzene to form chlorination product comprising monochlorobenzene, higher and lower polychlorobenzene and benzene in a first stage, and the hydrolysis in a second stage with steam of material comprising monochlorobenzene to form hydrolysis product comprising phenol, monochlorobenzene, steam and HCl, the method of separating and recovering phenol therefrom which comprises the steps of: (1) condensing said chlorination product with water, to form two-phase chlorination condensation product having an organic-phase and a water-phase, (2) separating the water-phase from the organic-phase of said liquid chlorination product, to form liquid organic-phase chlorination product comprising monochlorobenzene, higher and lower polychlorobenzene and benzene, (3) condensing said hydroylsis product to form hydrolysis condensation product comprising phenol, monochlorobenzene and water, (4) comingling the said hydrolysis condensation product with phenol-enriched organic chlorination product of step (6), to form a two-phase liquid mxedi product having an organic-phase and an aqueous-phase, (5) separating the organic-phase from the aqueous-phase of said two-phase liquid mixed product of step (4), to form an aqueous mixed product containing phenol and liquid organic mixed product, (6) extracting the phenol from the said aqueous-mixed product of step (5) with the said organic-phase of the said chlorination product, to form phenol-enriched organic chlorination product, and (7) passing said liquid organic mixed product of step (5) to a distillation train in which benzene, monochlorobenzene, an azeotrope-type mixture comprising lower polychlorobenzene and phenol, and a fraction consisting essentially of phenol, are separated therefrom.

7. In a continuous process for the production of phenol by the oxychlorination of benzene to form chlorination product comprising monochlorobenzene, higher and lower polychlorobenzene and benzene in a first stage. and the hydrolysis in a second stage with steam of material comprising monochlorobenzene, lower polychlorobenzene and chlorophenol to form hydrolysis product comprising phenol, monochlorobenzene, lower polychlorobenzene, chlorophenol, steam and HCl, the method of separating and recovering phenol therefrom which comprises: (1) condensing said chlorination product with water, to form chlorination condensation product comprising monochlorobenzene, higher and lower polychlorobenzene, benzene and water, (2) condensing said hydrolysis product to form hydrolysis condensation product comprising phenol, monochlorobenzene, lower polychlorobenzene, chlorophenol and water, (3) mixing said hydrolysis condensation product with said chlorination condensation product, to form a two-phase liquid mixed product having an organic-phase and an aqueous-phase, (4) separating the organic-phase from the aqueous-phase of said two-phase liquid mixed product, to form liquid organic mixed product, and (5) passing said liquid organic mixed product through a distillation train in which benzene, monochlorobenzene, an azeotrope-type mixture comprising lower polychlorobenzene, chlorophenol and phenol, and a fraction consisting essentially of phenol, are separated therefrom.

8. In a continuous process for the production of phenol by the oxychlorination of benzene to form chlorination product comprising monochlorobenzene, higher and lower polychlorobenzene and benzene in a first stage, and the hydrolysis in a second stage with steam of material comprising monochlorobenzene, lower polychlorobenzene and chlorophenol to form hydrolysis product comprising phenol, monochlorobenzene, lower polychlorobenzene, chlorophenol, steam and HCl, the method of separating and recovering phenol therefrom which comprises the steps of: (1) condensing said chlorination product with water and benzene, to form a two-phase chlorination condensation product having an organic-phase and a water-phase, (2) separating the water-phase from the organic-phase of the chlorination condensation product, to form liquid organic-phase chlorination product comprising monochlorobenzene, higher and lower polychlorobenzene and benzene, (3) condensing said hydrolysis product to form a hydrolysis condensation product comprising phenol, monochlorobenzene, lower polychlorobenzene, chlorophenol and water, (4) co-mingling said hydrolysis condensation product with the phenol-enriched organic chlorination product of step (6), to form a two-phase liquid mixed product having an organic-phase and an aqueous-phase, (5) separating the organic-phase from the aqueous-phase of said two-phase liquid mixed product of step (4) to form an aqueous mixed product containing phenol, and a liquid organic mixed product, (6) extracting the phenol from said aqueous mixed product of step (5) with said organic-phase of said chlorination product, to form a phenol-enriched organic chlorination product, and (7) passing said liquid organic mixed product of step (5) to a distillation train in which benzene, monochlorobenzene, an azeotrope-type mixture comprising lower polychlorobenzene, chlorophenol and phenol, and a fraction consisting essentially of phenol, are separated therefrom.

References Cited by the Examiner
UNITED STATES PATENTS

| | | | |
|---|---|---|---|
| 1,536,706 | 5/1925 | Ernst et al. | 260—650 |
| 1,935,648 | 11/1933 | Mares | 260—650 |
| 2,035,917 | 3/1936 | Prahl et al. | |
| 2,137,587 | 11/1938 | Poffenberger | 260—629 |
| 2,156,402 | 5/1939 | Prahl | 260—629 |
| 2,275,044 | 3/1942 | Grebe | 260—629 |
| 2,311,777 | 2/1943 | Redman | 260—629 |

FOREIGN PATENTS

| | | |
|---|---|---|
| 718,454 | 3/1942 | Germany. |
| 654,153 | 6/1951 | Great Britain. |

OTHER REFERENCES

Industrial and Engineering Chemistry, Agnello, vol. 52, No. 11, November 1960, pp. 894–900.

Angewandte Chemie, 47 JG No. 1, Prahl et al., Jan. 6, 1934 (pp. 11–13).

NORMAN YUDKOFF, *Primary Examiner.*

ALPHONSO D. SULLIVAN, *Examiner.*